United States Patent [19]
Gerow

[11] Patent Number: 5,190,432
[45] Date of Patent: Mar. 2, 1993

[54] DUMP TRUCK STONE SLINGER

[76] Inventor: Leonard Gerow, 36 Jackson Dr., N. Sydney, Cape Breton, N.S. B2A 3M6, Canada

[21] Appl. No.: 764,522

[22] Filed: Sep. 24, 1991

[51] Int. Cl.$^5$ .................................................. B60P 1/36
[52] U.S. Cl. .................................. 414/489; 414/523; 414/528; 414/504; 198/317; 198/318; 239/657; 239/676; 239/664
[58] Field of Search ............... 414/489, 523, 501, 502, 414/503, 504, 505, 527, 528, 519; 198/861.4, 861.5, 861.6, 861.1, 632, 317, 318; 239/657, 663, 664, 676, 672

[56] References Cited

U.S. PATENT DOCUMENTS

| | | | |
|---|---|---|---|
| 1,409,916 | 3/1922 | Barkmann et al. | 414/489 |
| 2,284,853 | 6/1942 | Wall | 414/504 |
| 2,584,069 | 1/1952 | Wall | 414/523 |
| 3,863,783 | 2/1975 | Spellman, Jr. | 414/523 |
| 3,923,175 | 12/1975 | Landvatter | 414/489 |
| 4,834,463 | 5/1989 | Nye | 414/523 X |
| 4,886,214 | 12/1989 | Musso, Jr. et al. | 414/489 X |
| 4,923,359 | 5/1990 | Petri et al. | 414/523 |
| 5,044,867 | 9/1991 | Pettijohn | 414/489 X |

*Primary Examiner*—Frank E. Werner
*Attorney, Agent, or Firm*—Whitham & Marhoefer

[57] ABSTRACT

A stone slinger option for a standard dump truck includes a swing arm pivotally connectable to the truck's chassis, an elongated frame pivotally connected to the swing arm and mounting an endless conveyor belt therein, and drive means for independently moving the swing arm and the frame. The frame can be moved from a stowed travel position adjacent the truck's chassis, below the dump body, to a rearwardly extending position in which it can receive material from the dump body for delivery to a dump site remote from the truck. The truck can operate in its standard dump mode or as a stone slinger, reducing costs at construction sites since additional, specialized stone slinger delivery vehicles will not be required.

12 Claims, 5 Drawing Sheets

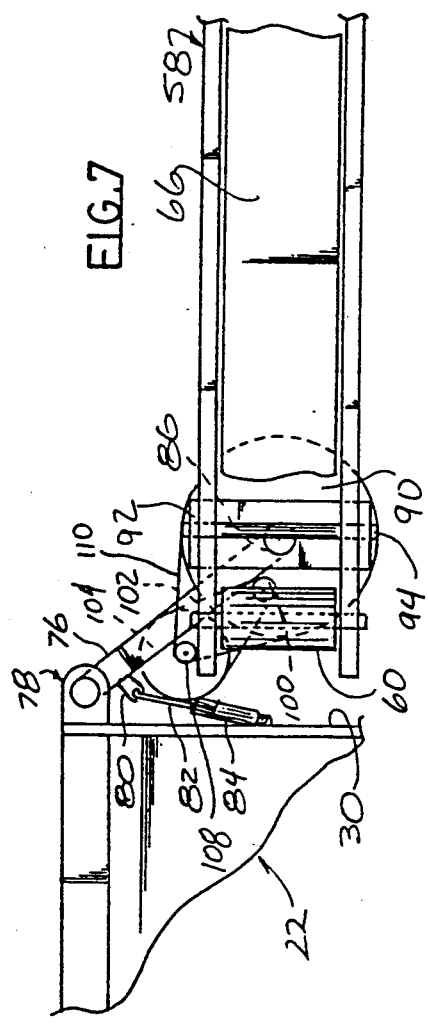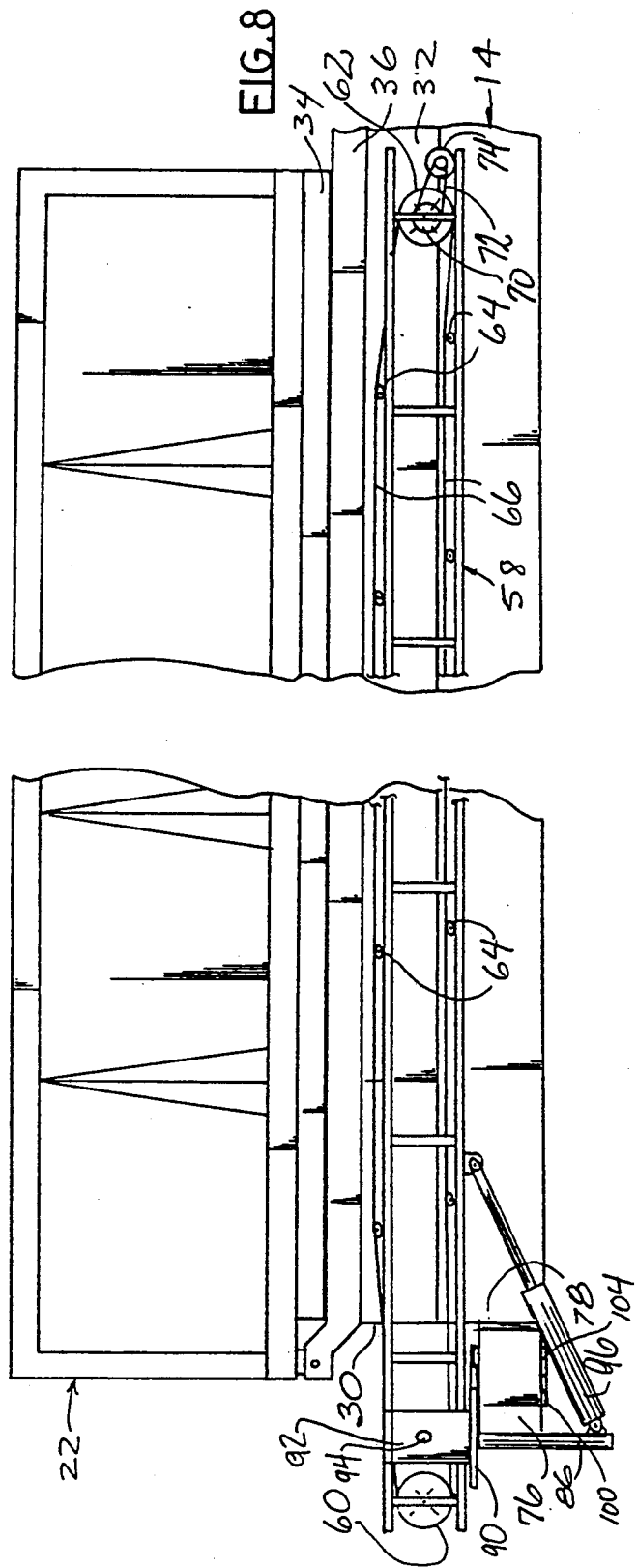

DUMP TRUCK STONE SLINGER

This invention relates to dump-type vehicles in general and, in particular, to a stone slinger option for such a vehicle.

BACKGROUND OF THE INVENTION

There are various vehicles which are used to carry loads, one of which is the dump truck. A dump truck normally carries particulate material such as gravel, soil or grain. The vehicle has a dump body which involves a generally rectangular box pivotally connected to the vehicle chassis or frame. Means, such as hydraulic cylinder and piston units, are provided to raise the forward end of the box so that the contents thereof will slide to the rear to exit the box through the tailgate. The tailgate extends across the box and is typically hinged to the box along an axis that extends along the top edge of the tailgate. The tailgate can be locked to the box to prevent inadvertent opening and it can also include a smaller opening with its own manually openable gate to direct the contents of the box in a path narrower than the full width of the tailgate. The smaller opening is used when it is desired to feed the box contents to a chute or a conveyor for movement along a particular path. A dump box can be provided on a self-propelled vehicle, creating a dump truck, or it can be provided on a towed vehicle such as a trailer or a rail car.

One particular task commonly performed is the carrying of crushed stone or gravel to a construction site. When residential housing is being constructed it is normal to provide a base of gravel within the boundaries of the foundation before the basement floor is poured. In a multi-unit housing tract there are many foundations under construction at the same time and very often a dump truck is unable to back right up to the foundation to deposit its load within the foundation. Furthermore, gravel is normally placed adjacent the outer wall of the foundation over and around the weeping tile of the ground water collection system. Again, the dump truck is often prevented from dumping its load exactly where it is needed. In such circumstances a "stone slinger" truck is used to deliver the gravel to the dump site.

A stone slinger has a hopper-like body that carries the gravel and includes a conveyor therebelow that receives the gravel from the hopper body at a position remote from the dump site and conveys it to the dump site itself within or adjacent the foundations walls. It can be moved as desired to place gravel at different spots so that the gravel can be spread more evenly by a gang of workmen. This way of distributing gravel at the construction site is quite inefficient since workmen must monitor the stone slinger, moving the vehicle as desired relative to the foundation. The workmen must also spread the gravel after it has been dumped and they must also move the stone slinger from one foundation to another after dumping is complete. A stone slinger vehicle is very specialized and very expensive to own, operate or rent.

SUMMARY OF THE INVENTION

The present invention overcomes the problems of the prior art as described by providing a stone slinger directly connected to a common dump truck so that it is always available whenever it is desired to dump gravel or other particulate material at a position remote from the truck. The stone slinger option involves a frame supporting an endless conveyor belt, a drive for the conveyor belt, and a pivot mechanism that allows the frame to move between a stowed position adjacent the vehicle frame and a working position extending away from the dump body. The conveyor frame can be directed straight rearwardly of the vehicle or it can be directed at an angle relative to the vehicle as convenient. When the dump box is raised the smaller opening in the tailgate is used to direct the contents onto the conveyor for transport to the dump site itself. Additionally, the conveyor frame can be connected to the vehicle frame so that the angle of elevation thereof is adjustable, in the event that there are differences in elevation between the dump truck and the dump site.

The stone slinger may be built in to the vehicle at the factory or it may be added to any dump vehicle at a later date. Preferably the dump box will be raised relative to its normal position so as to provide enough room therebelow for the stone slinger frame. The stone slinger option is not restricted to self-propelled dump trucks per se. It can be used with towed dump trailers, dump-type rail cars, or gravity feed type rail cars used to carry grain or coal. All that is required is power to drive the conveyor belt as it receives the contents of the vehicle so that those contents can be moved to the desired dump site. When the stone slinger is used with a dump truck or a dump trailer the dump box can be provided with flow directing walls which cause the contents to flow smoothly towards the smaller opening in the tailgate. Such walls need not be the full height of the dump box, or they can be pivotable or removable, so that normal operation of the dump vehicle will not be impaired. During such operation the stone slinger will remain in its stowed condition underneath the dump box and the full tailgate will be opened for rapid discharge of the box contents.

By providing a stone slinger directly on a dump vehicle the task of filling foundations becomes almost a one-man job, since an entire work crew and another specialized vehicle is no longer required. The vehicle operator can control the path that the gravel takes from the vehicle to the dump site and a fleet of dump trucks can readily complete the provision of gavel to an entire construction site in much less time than at present. The savings to the contractor will be great and will more than justify the cost of providing a fleet of trucks with their own stone slingers.

Generally speaking therefore the present invention may be considered as providing a stone slinger attachment for a vehicle having a wheeled, elongated chassis, a dump body pivotally connected to the chassis, means for pivotally moving the dump body between a lowered travel position and an elevated dump position, and movable gate means in the dump body, the attachment means comprising: swing arm means for pivotal connection at one end thereof to the chassis; elongated frame means pivotally connected at one end thereof to the other end of the swing arm means; and means for independently moving the swing arm means and the frame means about respective pivot axes to move the frame means from or to a stowed position adjacent the chassis to or from a working position extending away from the vehicle, the frame means carrying independently operable conveyor means for moving material discharged from the dump body through the gate means to a desired location remote from the vehicle adjacent the other end of the frame means.

BRIEF DESCRIPTION OF THE DRAWINGS

FIG. 7 is another partial plan view, showing the stone slinger extended.

FIG. 8 is a partial side elevation showing the stone slinger in its stowed position.

DESCRIPTION OF THE PREFERRED EMBODIMENT

Figure 1:
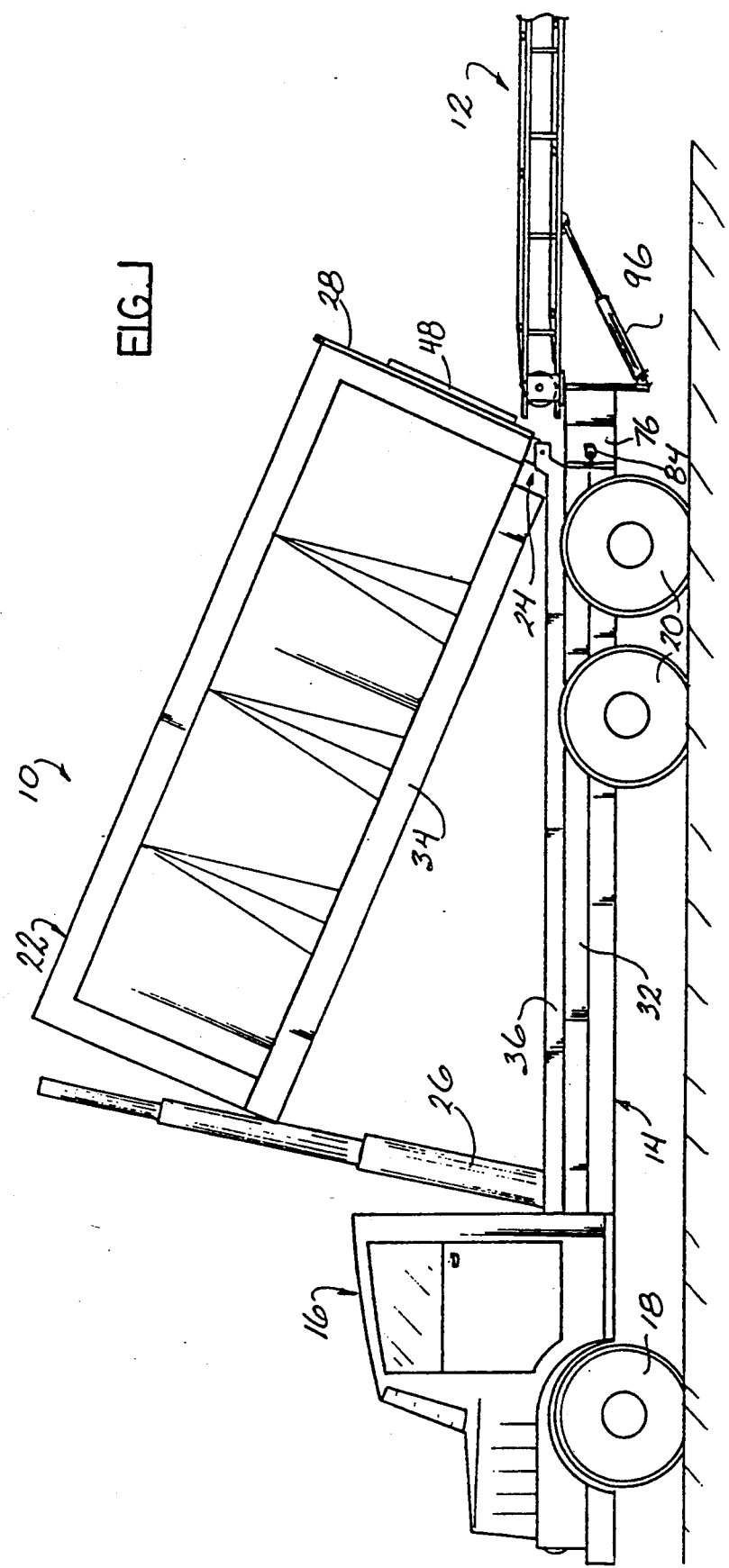
FIG. 1 is a side elevation of a dump truck provided with a stone slinger, shown in the extended position, in accordance with the invention.

FIG. 1 illustrates a dump truck 10 provided with the stone slinger option 12 of the present invention. The truck 10 includes a chassis or frame 14 supporting a cab 16 for the motor and the driver, a pair of forward steering wheels 18 and a tandem set of rear drive wheels 20. A rectangular dump box 22 is pivotally connected at the rear thereof, as at 24, and an elevating device 26, such as an hydraulic jack, is provided for elevating the opposite end of the box 22. All of these components are standard for a dump truck and need not be described in further detail herein. If one is dealing with a towed dump trailer instead of a self-propelled vehicle the major difference would be the absence of the cab 10, and the drive train. The frame, dump box and elevating device would still be provided.

Figure 2:
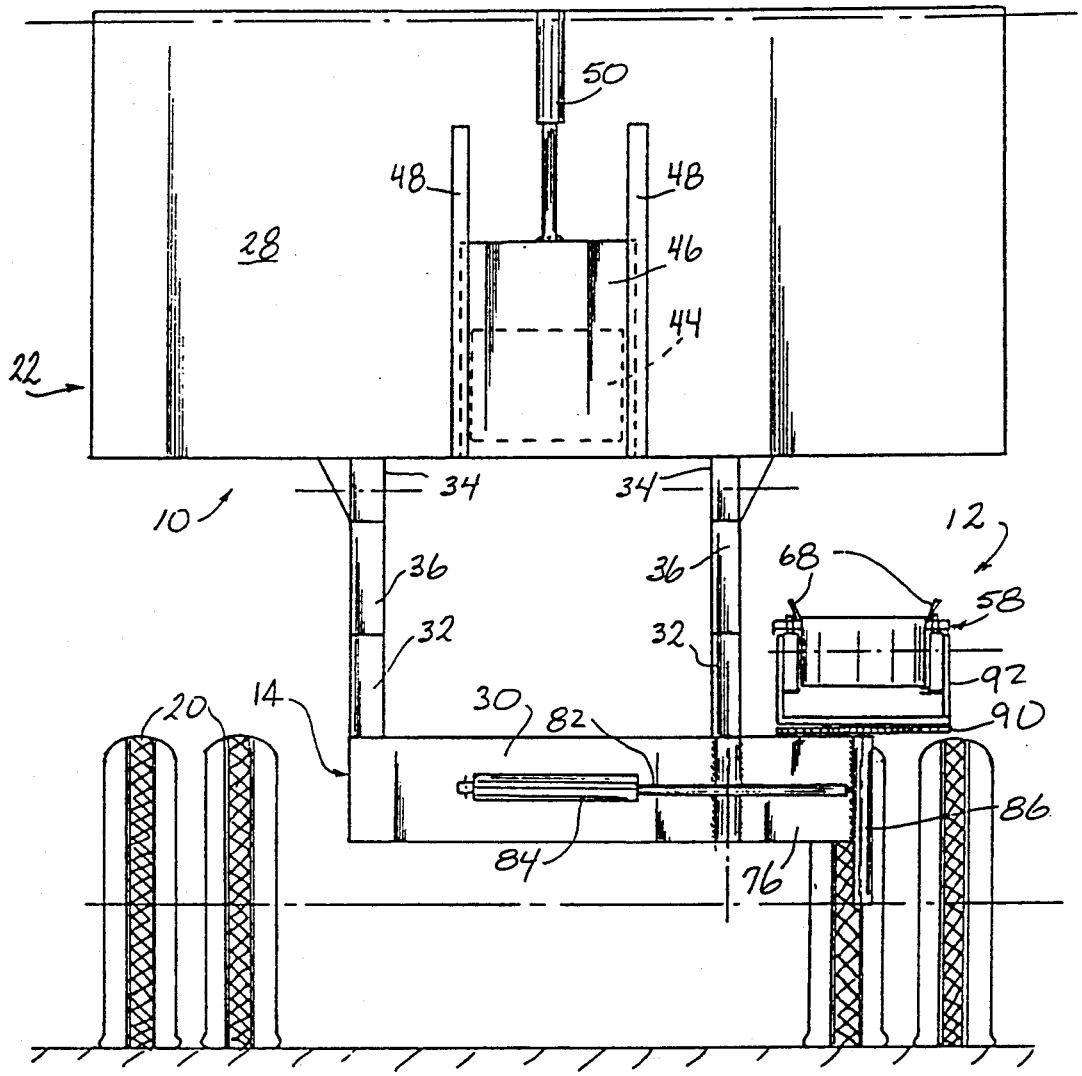
FIG. 2 is a rear end view of a dump truck provided with a stone slinger, shown in the stowed position.
Figure 3:
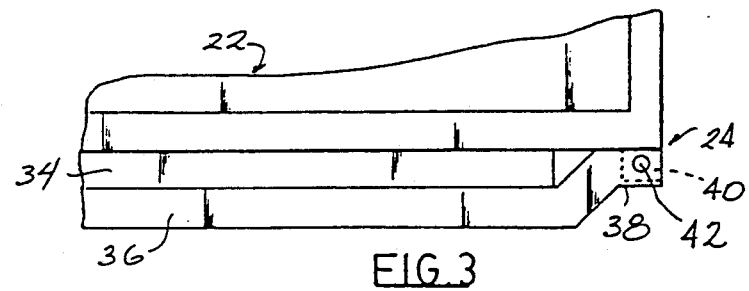
FIG. 3 is an enlarged partial side elevation showing the pivot mechanism for the dump box.
Figure 4:
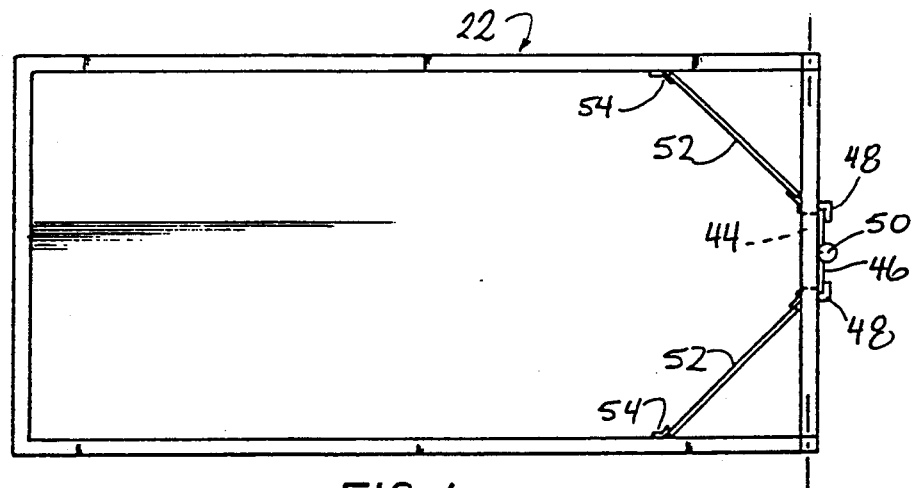
FIG. 4 is a plan view of the dump box.

FIGS. 2, 3 and 4 show other details of the dump truck 10, including the tailgate 28 which closes the rear opening of the dump box 22. The tailgate 28 is normally pivotally attached at the top and can be locked in its closed position by a pneumatic lock (not shown). When the pneumatic lock is disengaged the tailgate 28 will swing to an open condition as the dump box is elevated to allow the contents to discharge from the dump box over the full width thereof. Also shown in those figures are the rearmost cross-member 30 of the frame 14, the longitudinal rails 32 of the frame 14, and the rails 34 extending along the bottom of the box 22.

In order to add the slinger option 12 to a standard dump truck it is desirable to effect certain modifications to the dump truck to improve ease of assembly and efficiency of the modified vehicle. One such modification involves raising the entire dump box by about six inches. After removing the box 22 from a standard dump truck a pair of auxiliary frame rails 36 is welded to the frame rails 32 as best seen in FIGS. 1, 2 and 3. At the rear end each rail 36 includes a raised portion 38 which mates with a standard pivot lug 40 on the dump box 22, a pivot pin or shaft 42 extending therethrough to effect the pivot connection of the box 22 to the vehicle frame. When the box is in its lowered condition reach box rail 34 will rest on an auxiliary rail 36 rather than a frame rail 34.

The tailgate 28 should also be modified to create a narrow central opening 44 which will allow a narrow stream of particulate material to exit the dump box onto the slinger. The opening 44 is closed by a reciprocable gate 46 guided by side guides 48 and powered by a hydraulic cylinder and piston assembly 50. Of course, any type of gate could be used to open or close the opening 44, the illustrated mechanism being but one example.

Internally, as seen in FIG. 4, the box 22 may have a pair of flow directing walls 52 removably or pivotally attached to the box side and end walls by brackets 54. When the dump truck is not being used as a stone slinger the walls 52 would be removed or pivoted to one side so that the full width of the box is available for discharge of the contents thereof. With the walls 52 in place, the contents of the box will be funnelled towards the opening 44 for discharge therethrough when the gate 46 is open.

The stone slinger option of the present invention will now be described with particular reference to FIGS. 1, 2 and 5 to 8. This option involves an elongated truss-like frame 58 having a length about the same as the length of the box 22. The frame 58 includes end drums 60,62 and intervening spaced apart idler rollers 64 extending across the upper and lower levels of the frame. An endless conveyor belt 66 extends around the end drums 60,62 and is supported along the frame 58 by the idler rollers 64. Side guides 68 (FIG. 2) extend along the frame 58 on each side of the upper run of the belt 66 so as to define a channel for the particulate material to be carried by the belt 66.

The drum 62 is connected to a pulley 70 (FIG. 8) which in turn is connected via drive belt 72 to an hydraulic or electric motor 74 contained in the frame 58. The motor 74 will impart appropriate drive to the belt 66 to move the upper run thereof in a direction away from the dump box. The drive for the belt 66 is conventional and need not be described in further detail. Any suitable drive system can be used.

At one end of the rearmost cross-member 30 there is pivotally connected thereto a swing arm 76 having a height similar to that of the cross-member 30 and a length sufficient to position the slinger frame 58 adjacent the vehicle frame 14. The pivot or hinge connection 78 is conventional and will permit pivotal movement of the arm 76 through at least 90° and perhaps up to about 135°. A lug 80 on the arm 76 is connected to the rod 82 of an hydraulic cylinder 84 which in turn is connected to the cross-member 30 to effect pivotal movement of the swing arm 76.

At its free end the swing arm 76 carries a vertically extending hollow bushing 86, the lower end of the which extends below the bottom edge of the swing arm 76. The bushing 86 bearingly receives a shaft 88 (FIG. 6), the upper end of which carries a large diameter (e.g. 19 inches) sprocket 90 and a U-shaped yoke 92. The near end of the frame 58 is pivotally connected to the yoke 92 by the pivot pin 94 which also may act as the shaft for the belt drum 60 if the drum 60 is positioned within the yoke as in FIG. 1. The other views show the drum mounted rearwardly of the yoke 92. The frame 58 has limited vertical pivotal movement capabilities, such movement being provided by a hydraulic cylinder assembly 96 one end of which is connected to the lower extension of the bushing 86 and the other end of which is connected to the frame 58 along the length thereof from the yoke 92.

The swing arm 76 carries a motor 98 which may be hydraulic or electric. The drive shaft of the motor carries a small diameter (e.g. 2 inch) sprocket 100 which connects via chain 102 to an idler sprocket 104 mounted to one end of a vertical idler shaft 106. The shaft 106 is bearingly mounted on the swing arm 76 and carries another idler sprocket 108 at the upper end thereof. The sprocket 104 is preferably about eight inches in diameter while the sprocket 108 is preferably about two inches in diameter. Sprocket 108 is connected to the sprocket 90 by a chain 110.

Figure 5:
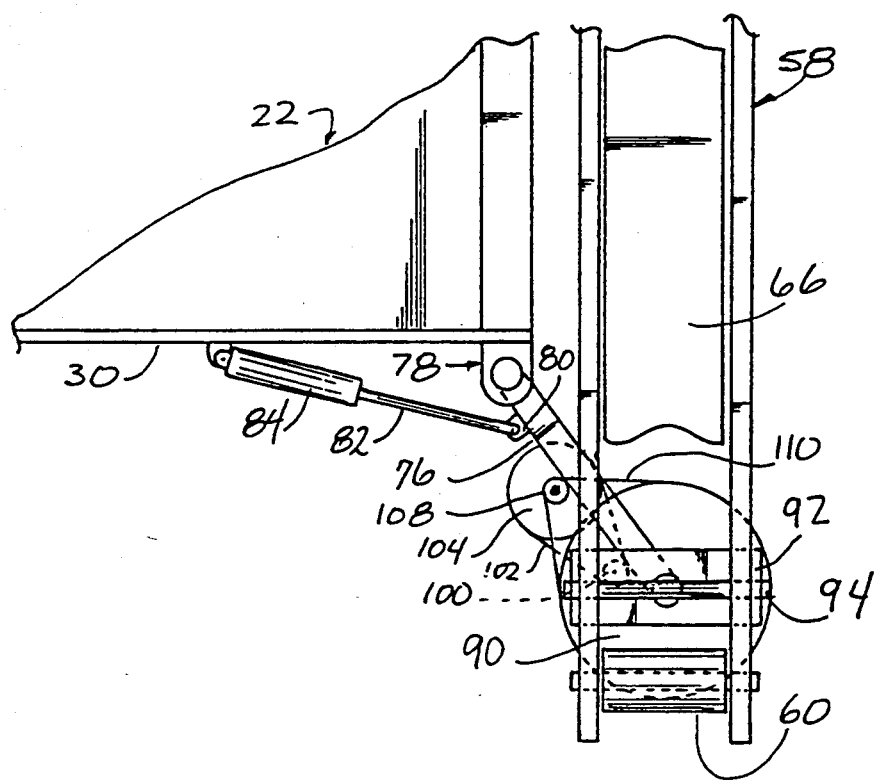
FIG. 5 is a partial plan view of the structure connecting the stone slinger to the frame.
Figure 6:
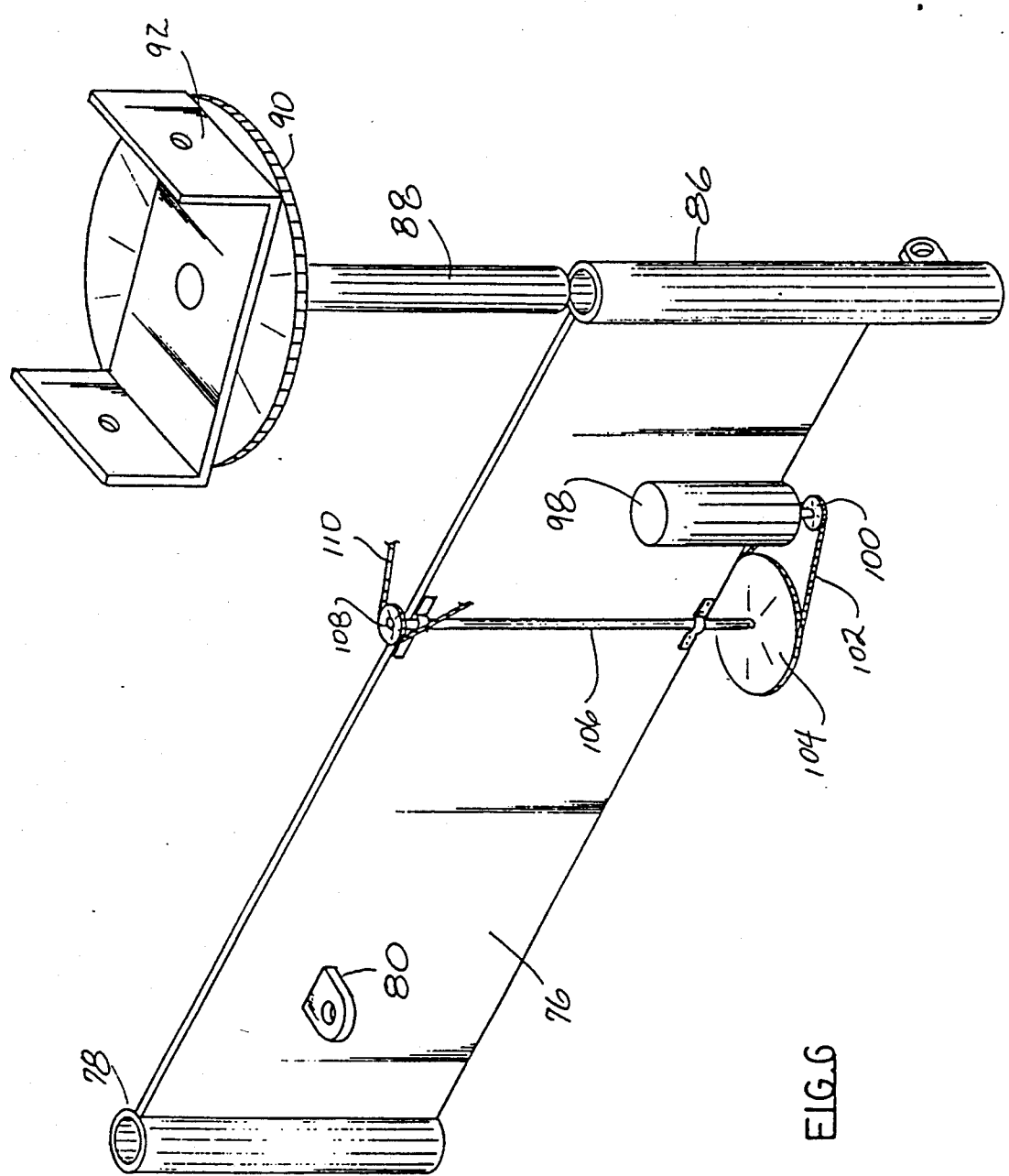
FIG. 6 is a perspective view, partially exploded, of the connecting arm used with the invention.

The operation of the present invention, once the stone slinger 12 has been installed on the vehicle is as follows. It will be assumed that the slinger 12 is initially in its stowed position as shown in FIGS. 2, 5 and 8.

The dump truck 10, loaded with crushed gravel or other particulate material is backed into position in close proximity to a dump site, such as adjacent the foundation of a newly constructed house. The operator will first of all operate suitable hydraulic controls, not shown, to actuate the hydraulic cylinder assembly 84 which will cause the swing arm 76 to rotate about the pivot connection 78, in turn causing the frame 58 to start to swing away from its stowed position adjacent the vehicle frame 14. During this swinging operation the motor 98 may be actuated so as to cause the frame 58, via the sprockets 100, 104, 108 and 90 and the chains 102, 110, to rotate on its shaft 88 relative to the swing arm 76. Eventually, the swing arm 76 and the frame 58 will take up the opposition shown in FIGS. 1 and 7 with the frame 58 extending rearwardly from the dump box 22 in a line with the dump site and with the belt 66 positioned below the opening 44 in the tailgate 28. The dump box may then be elevated and the gate 46 raised to allow particulate material to discharge through the opening 44 at a controlled rate onto the belt 66. The belt drive motor 74 is actuated so that the belt 66 will carry the particulate material from the material receiving end adjacent the dump box 22 to the discharge end adjacent the dump site. If the discharge end needs to be raised or lowered for more accurate deposition of the material such may be accomplished by operating the hydraulic cylinder assembly 96.

The frame 58 can be rotated relative to the swing arm 76 during the dumping operation, preferably slowly, by operating the motor 98. In this way a line, rather than a pile, of material will be created at the dump site.

Once the truck is empty, or the desired amount of material has been deposited at the dump site, the controls are operated to rotate the frame 58 relative to the swing arm 76 and to swing the swing arm 76 relative to the cross-member 30 so as to move the frame 58 back to its stowed position adjacent the frame 14. The truck can then go on to another dump site or back to the gravel pit for another load. Also, if desired, it can be used as a conventional dump truck at any time, with the frame 58 stowed, the flow directors 52 removed or pivoted to one side, and the full tailgate 28 being opened for full discharge as required.

It is readily seen that the present invention greatly increases the versatility of a standard dump truck and greatly increases the efficiency of the "stone slinging" operation at a construction site. Fewer people are required to perform the slinging function and the cost of renting or purchasing dedicated stone slinging equipment is avoided.

The preferred form of the present invention has been described herein. It is understood however that many components could be altered by a skilled workman without departing from the spirit of the invention. Thus the protection to be afforded this invention is to be determined from the scope of the claims appended hereto.

The embodiments of the invention in which an exclusive property or privilege is claimed are defined as follows:

1. A material delivery attachment for a vehicle having a wheeled, elongated chassis, a dump body pivotally connected to said chassis, means for pivotally moving said dump body between a lowered travelled position and an elevated dump position, and movable gate means in said dump body, said attachment means comprising:
    swing arm means for pivotal connection at a first end thereof to said chassis;
    elongated frame means pivotally connected at one end thereof to a second end of said swing arm means;
    means for independently moving said swing arm means and said frame means about a respective pivot axis to move said frame means from or to a stowed position adjacent said chassis to or from a working position extending away from said vehicle, said frame means carrying independently operable conveyor means and drive means therefor for moving material discharged from said dump body through said gate means to a desired location remote from said vehicle adjacent the other end of said frame means;
    a generally vertically extending bushing at said second end of said swing arm means;
    a shaft receivable in said bushing;
    a large diameter first sprocket and a yoke member connected to an upper end of said shaft with said frame means being pivotally mounted within said yoke member;
    a small diameter second sprocket connected below a lower edge of said swing arm means to a shaft of a first motor means mounted on said swing arm means;
    an intermediate diameter third sprocket connected to a lower end a vertically extending idler shaft bearingly mounted on said swing arm means;
    a first chain member drivingly interconnecting said second and third sprockets;
    a small diameter fourth sprocket connected to an upper end of said idler shaft; and
    a second chain member drivingly interconnecting said fourth and first sprockets.

2. The attachment of claim 1 wherein said means for independently moving said swing arm means comprises a first hydraulic cylinder and rod assembly connectable between said chassis and said swing arm means.

3. The attachment of claim 2 including a second hydraulic cylinder and rod assembly extending between a lower end of said bushing and said frame means for selectively pivoting said frame means about an axis passing through said frame means and said yoke member.

4. The attachment of claim 3 wherein said conveyor means includes an idler drum at one end of said frame means, motor means connected to a drive drum at the other end of said frame means, a plurality of transversely extending idler rollers spaced apart along upper and lower runs of said frame means, and endless belt means entrained about said drums and supported by said rollers.

5. A combination dump truck and material delivery apparatus, said dump truck comprising:
    a wheeled vehicle chassis having a cab portion at one end;

a dump body hingedly attached at a rear end thereof to said chassis;

means for pivotally moving said dump body between a lowered travel position and an elevated dump position;

lockable tailgate means pivotally connected to said dump body at said rear end thereof; and smaller, independently operable gate means for selectively opening and closing a small opening in said tailgate means; and said material delivery apparatus comprising:

swing arm means pivotally connected at a first end thereof to said chassis;

elongated frame means pivotally connected at one end thereof to a second end of said swing arm means;

means for independently moving said swing arm means and said frame means about a respective generally vertical axis to move said frame means from or to a stowed position adjacent said chassis to or from a working position extending rearwardly of said dump truck, said frame means supporting independently operable conveyor means and drive means therefor for moving material discharged from said dump body through said small opening to a desired location remote from said dump truck adjacent the other end of said frame means;

a vertically extending bushing at said second end of said swing arm means;

a shaft receivable in said bushing;

a large diameter sprocket and a U-shaped yoke member connected to an upper end of said shaft with said frame means being pivotally mounted within said yoke member;

a small diameter second sprocket connected below a lower edge of said swing arm means to a shaft of first motor means mounted on said swing arm means;

an intermediate diameter third sprocket connected to a lower end of a vertically extending idler shaft bearingly mounted on said swing arm means;

a first endless chain drivingly interconnecting said second and third sprocket;

a small diameter fourth sprocket connected to an upper end of said idler shaft; and a second endless chain drivingly interconnecting said fourth and first sprockets.

6. The combination of claim 5 including flow directing members positionable within said dump body for directing material during dumping to said small opening.

7. The combination of claim 5 including chassis rail means secured to said chassis thereabove for raising said dump body from a normal position atop said chassis.

8. The combination of claim 5, wherein said means for independently moving said swing arm means comprises a first hydraulic cylinder and rod assembly connected between said chassis and said swing arm means.

9. The combination of claim 8 including a second hydraulic cylinder and rod assembly extending between a lower end of said bushing and said frame means for selectively pivoting said frame means about an axis passing through said frame means and said yoke.

10. The combination of claim 5 wherein said conveyor means includes an idler drum at one end of said frame means, motor means connected to a drive drum at the other end of said frame means, a plurality of transversely extending idler rollers spaced apart along upper and lower runs of said frame means, and endless belt means entrained about said drums and supported by said rollers.

11. The combination of claim 10 including material guide walls extending along the upper run of said frame means on each side of said belt.

12. The combination of claim 5 including spaced apart guide members on said tailgate means for guiding said gate means during movement thereof, and independently operable hydraulic cylinder and rod means connected between said gate means and said tailgate means for moving said gate means.

* * * * *